Figure 1:
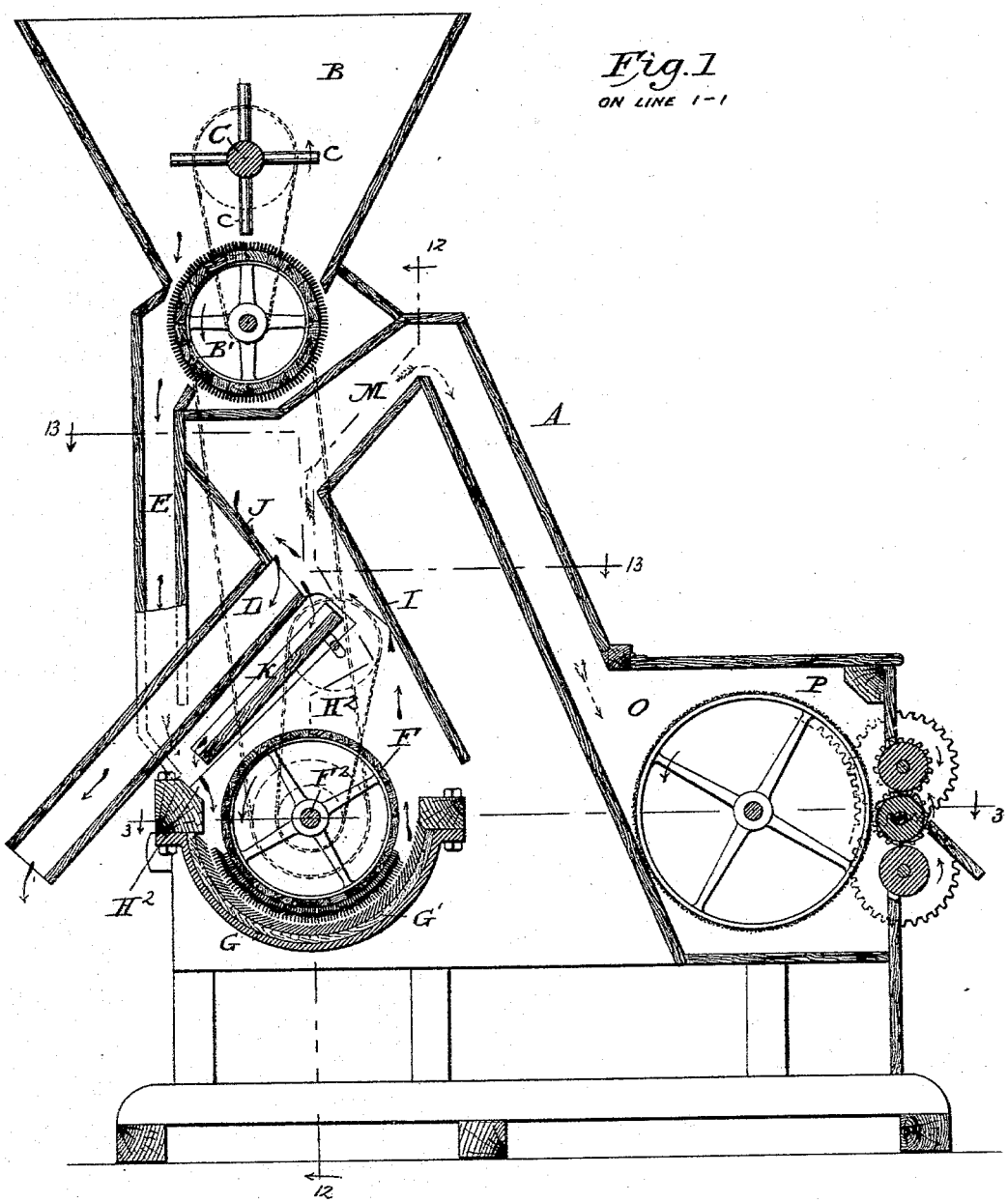

(No Model.) 5 Sheets—Sheet 1.

R. F. SPANGENBERG.
COTTON SEED DELINTER.

No. 495,069. Patented Apr. 11, 1893.

ON LINE 1-1

Attest.

Inventor.
ROBERT F. SPANGENBERG
by his attorneys
Baldwin Davidson & Wight (No Model.)  R. F. SPANGENBERG.  5 Sheets—Sheet 2.
COTTON SEED DELINTER.
No. 495,069.  Patented Apr. 11, 1893.
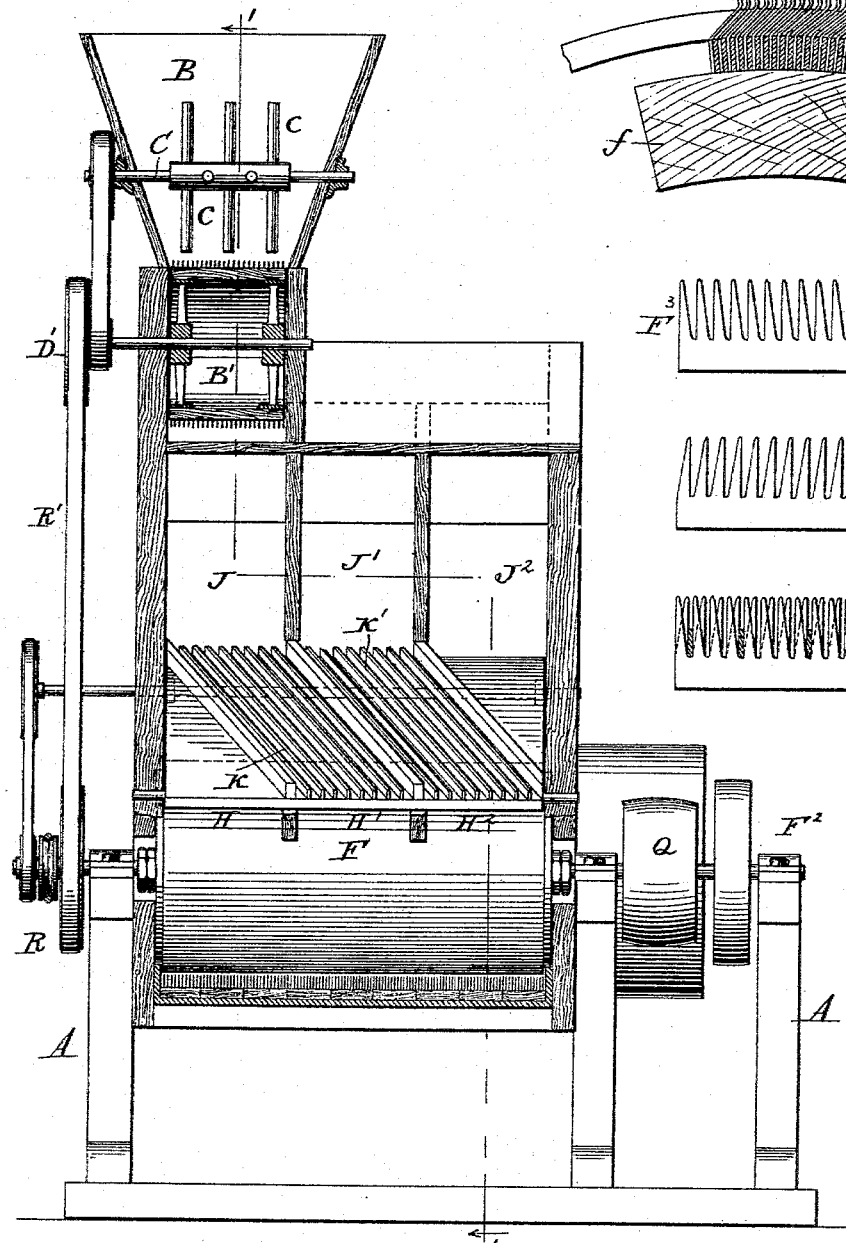
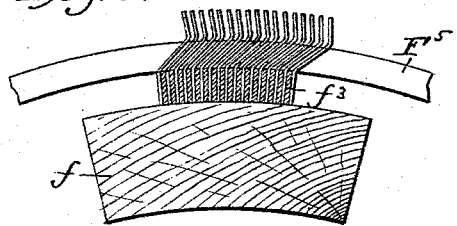
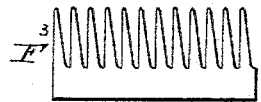
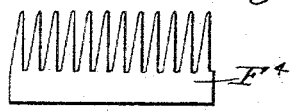
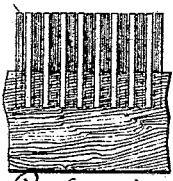
Attest
C. W. Brooke
Sidney P. Hollingsworth
Inventor:
Robert F. Spangenberg
by his attorneys,
Baldwin Davidson & Wight (No Model.)  R. F. SPANGENBERG.  5 Sheets—Sheet 3.
COTTON SEED DELINTER.
No. 495,069.  Patented Apr. 11, 1893.
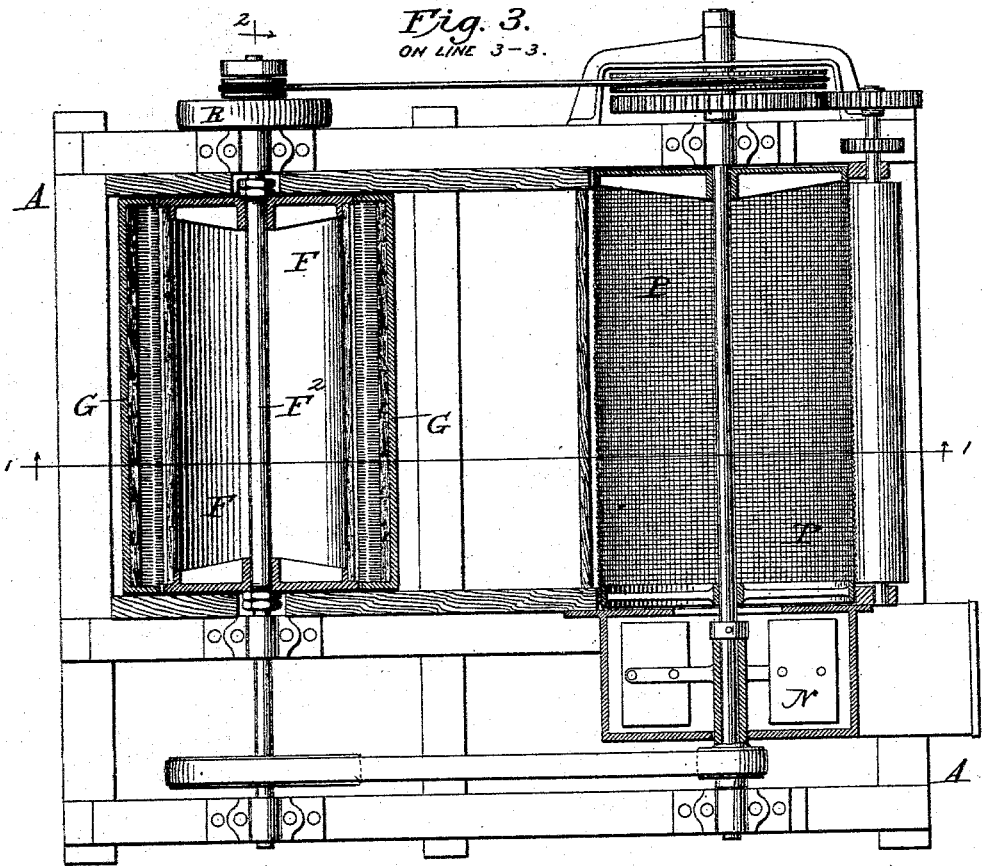
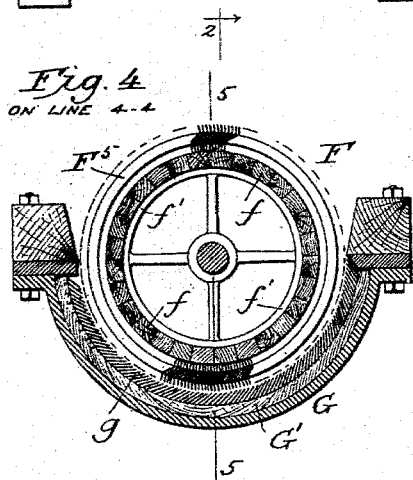
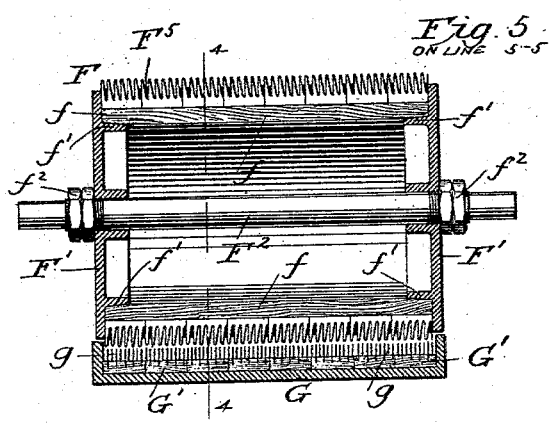
Attest:  Inventor
Sidney P. Hollingsworth  ROBERT F. SPANGENBERG
L. M. Brooke  by his attorneys
  Baldwin Davidson & Wight (No Model.) 5 Sheets—Sheet 4.
R. F. SPANGENBERG.
COTTON SEED DELINTER.

No. 495,069. Patented Apr. 11, 1893.

ON LINE 12-12

Witnesses
Sidney P. Hollingsworth
B. Washington Miller

Inventor
ROBERT F. SPANGENBERG
by Baldwin Davidson & Wight
Attorneys

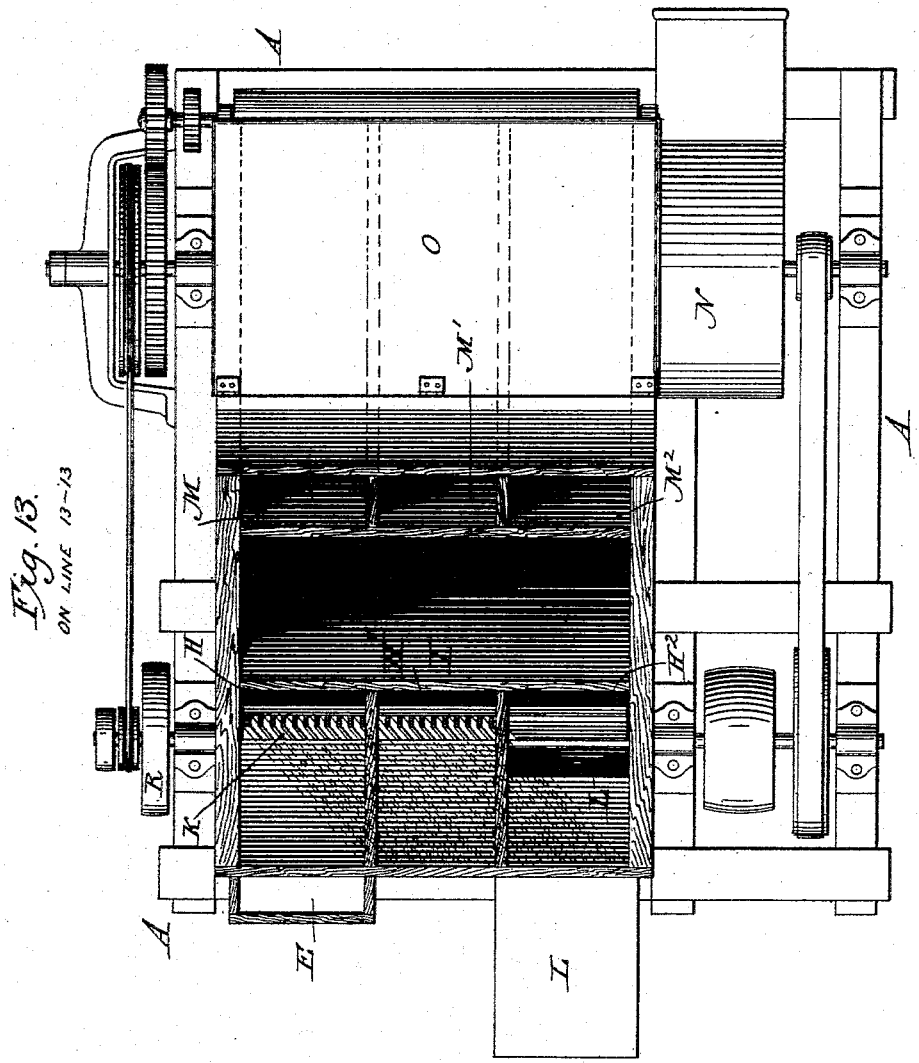

UNITED STATES PATENT OFFICE.

ROBERT F. SPANGENBERG, OF NEW ORLEANS, LOUISIANA.

COTTON-SEED DELINTER.

SPECIFICATION forming part of Letters Patent No. 495,069, dated April 11, 1893.

Application filed March 11, 1891. Serial No. 384,575. (No model.)

*To all whom it may concern:*

Be it known that I, ROBERT FERRIDAY SPANGENBERG, a citizen of the United States, and a resident of the city of New Orleans, in the parish of Orleans and State of Louisiana, have invented certain new and useful Improvements in Cotton-Seed Delinters, of which the following is a specification.

My invention relates to a class of apparatus in which the cotton-seed, after undergoing the ordinary ginning process, is subjected to further mechanical manipulation to remove any remaining lint and fiber from the seed, and to assort them in different grades.

The object of my invention is to produce cheap, simple and effective mechanism for obtaining these results, to which end my improvements consist in certain novel constructions, combinations and organizations of instrumentalities hereinafter specified.

In order to carry out my invention, I place the cotton-seed in a hopper provided with means for stirring the mass and keeping it in a loose condition, to enable it to be fed properly by a spiked feed-roller through a chute which delivers it upon one end of a linter comb-roller, between which roller and a suitable concave the seeds pass and are deprived of their longer lint, the seed being thrown by centrifugal force against suitable inclines which conduct them into another compartment, where they again pass around between the roller and concave, thus separating another portion of the lint, while the seed pass through another set of inclines to another portion of the roller, where the same process is repeated; when the thoroughly cleaned seed are discharged from the machine. The lint from each compartment is drawn through its appropriate trough by a suction-fan through a condenser, whence it is discharged into a suitable receptacle, each grade being thus kept separate for future treatment.

The accompanying drawings show so much apparatus embodying all my improvements as is necessary to illustrate the subject-matter herein claimed.

Unless otherwise indicated, the parts are of usual well-known construction.

Figure 12:
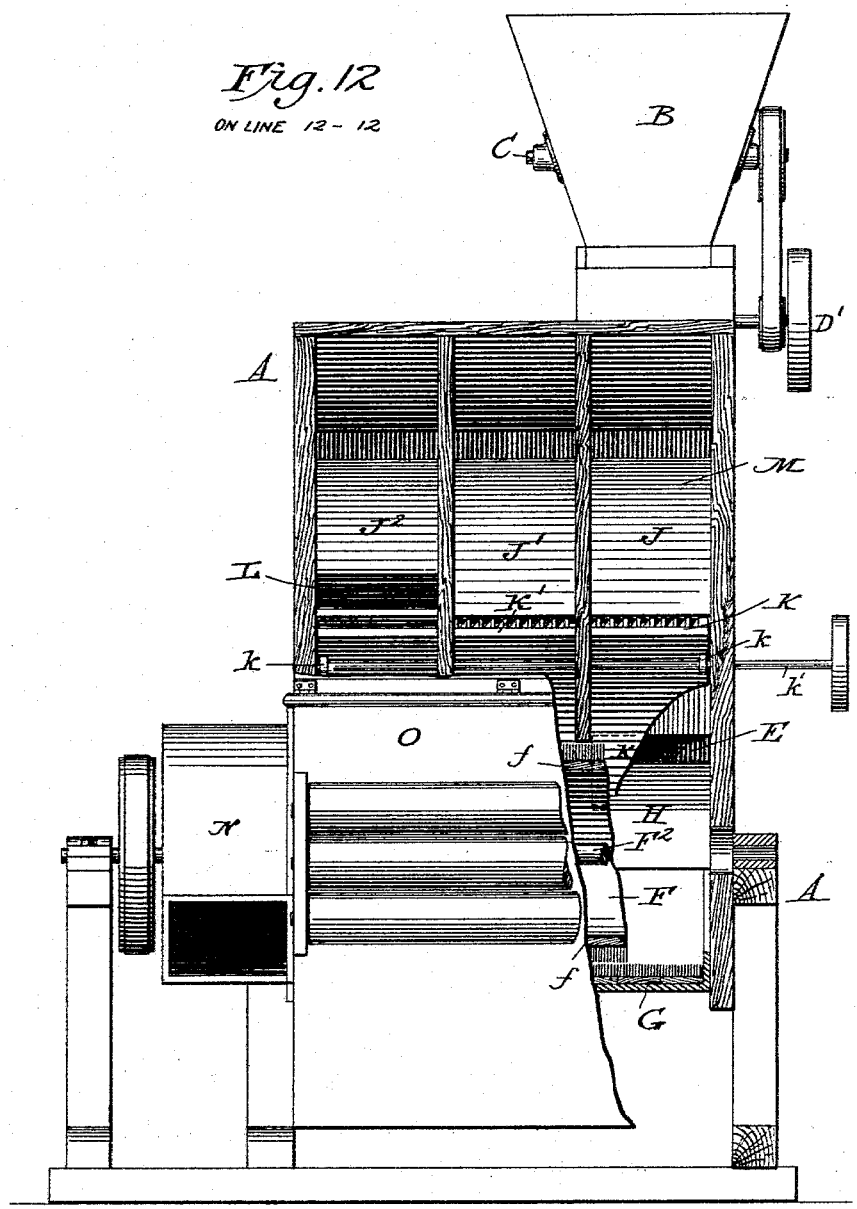

Figure 1 represents a vertical, longitudinal section through the machine, on the line 1—1 of Fig. 3 looking to the left; Fig. 2, a vertical, transverse section, on the line 2—2 of Fig. 3, looking backward which latter is a plan view of the machine with portions broken away to show the details more clearly. Fig. 4 is a vertical, transverse section, on the line 4—4 of Fig. 5, which latter is a vertical, central, longitudinal section, on the line 5—5 of Fig. 4, through the linter comb-roller and concave. Figs. 6, 7, 8, and 9 show details of the linter comb-roller on a larger scale. Figs. 10 and 11 illustrate details of construction of the concave. Fig. 12 shows a rear elevation with parts broken away, and with other parts in section, on the line 12—12, of Fig. 1; and Fig. 13, a plan view, partly in section on the line 13—13, of Fig. 1.

The short unfeathered darts show the direction in which the sections are taken and of the movements of the traversing parts of the mechanism.

The black feathered arrows represent the course of the seed; and the dotted feathered arrows, that of the lint.

The hopper-end of the machine, I term the front; the opposite end, the rear. That side of the machine on the right-hand of a person facing its front end, I term the right; the opposite, the left.

The mechanism is shown as mounted in a stout main frame A. The cotton-seed are fed into a hopper B, on the upper front portion of this frame. A stirrer-shaft C, turning in bearings in the hopper, is provided with suitable blades or vanes $c$, to stir them and keep them in a loose condition, to prevent their matting, and to cause them to be fed properly to a feed-roller B', preferably composed of longitudinal wooden staves into which iron pegs or teeth about a quarter of an inch long are inserted. From this roller the seed descend through a chute E, to a linter comb-roller F, of a peculiar construction, which I will now describe. The body of this roller is composed of longitudinal wooden staves $f$, beveled slightly at their inner ends—see Fig. 5—which ends rest on the inwardly-projecting flanges $f'$ of head-plates F', clamped upon a shaft $F^2$, by jam-nuts $f^2$. A series of comb-sections $F^3$, $F^4$, are arranged radially longitudinally and end to end around the roller, with their inner ends abutting against the staves $f$. These sections are held in place by circumferential rings $F^5$, lying between the teeth at intervals. The flanges $f'$, it will be observed, taper inward, and act upon the inclined ends of the staves $f$, to force them outward against the back of the combs, which are thus forced against the rings, thus clamping all the parts securely together. The comb-sections are kept a proper distance apart by wedge-plates $f^3$. The teeth of the combs are peculiarly constructed; they are preferably made of aluminium-bronze, a material which will not corrode, are of an elongated, tapering form to give them a stiff base, while their edges and tips are rounded to prevent injury to the seed. Their tips are hooked or bent slightly forward like those of a gin-saw or card-cloth, so as more readily to separate the lint from the seed.

Fig. 6 shows the manner in which the teeth are bent, so as to lie parallel with each other. Each alternate comb has its teeth inclined slightly laterally in opposite directions, as shown in Figs. 7 and 8, so that when placed alternately side by side their teeth overlap, as shown in Fig. 9. The object of this construction and organization is to present as close and compact a surface as possible, to prevent seed lodging between the teeth, and thus escape from the machine without proper treatment. Another advantage of this organization is the production of an elastic, scraper-like surface to the teeth, which yields inwardly radially more than circumferentially, thereby adapting itself to the shape of the seed with less strain than if the teeth were straight. I have found this a great improvement on the card-cloth or steel-wire brushes heretofore employed, as such teeth, if short, close, and stiff enough to resist the digging of the seed into the surface, do not possess sufficient flexibility; while, if made of longer wire, the seed will dig into the surface, and imperfect work will result.

As hereinafter more fully explained, the roller is divided transversely into three sections; the teeth of the first section are hooked slightly forward like the teeth of a gin-saw, to take off the long lint in the first operation; the teeth of the second and third sections, which take off the shorter lint, may be made less stiff, straighter, and closer together.

In the treatment above described, the seed pass between the linter comb-roller F, and a semi-cylindrical concave G, surrounding its lower portion. This concave is composed of a smooth semi-cylinder of iron, filled with wooden segments G', with the grain parallel with the axis of the concave, and having flat prongs or springs $g$, $g'$, of steel, inserted therein, in alternate rows, each set differing in shape from the other. The prongs $g$, are stiffer and farther apart circumferentially than the other set $g'$. The prongs $g$, are somewhat more elastic than the linter comb-teeth; they are shaped as shown, and bent backward, so as to present a compact, elastic surface into which the teeth cannot dig, but are pressed by their spring-like prongs with the same uniform force against the linter comb-teeth; the other set of prongs, $g'$, by their spacing and greater stiffness, serve to retain the seed a sufficient time to allow the linter-teeth to act properly thereon. The seed from the chute E, first enter the compartment H, on the left side of the machine and after passing between the linter comb-teeth and concave, are thrown by centrifugal force against an upwardly and forwardly inclined board I, which deflects them upwardly and forwardly toward the feed-roller B', against the casing of which they strike, and then fall upon an incline J, which delivers them upon the first of a series of inclined shaking-troughs K, K' over which they pass into the central or second compartment H', of the linter-comb roller around which they pass, and are again thrown upon a corresponding series of inclines which second series of inclines J', and shaking-troughs K' deliver them to the third compartment of the linter comb-roller $H^2$, whence they are thrown against a third series of inclines $J^2$, from which they pass by a discharge spout L, to a suitable receptacle. The longer lint, which is separated from the seed in the first compartment, accompanies the seed in its upward travel past the incline I, and is sucked out through a lint duct M, by an exhaust-fan N, into a lint-chamber O, containing a condenser P, similar to the ordinary condenser, but with finer wire cloth covering it, whence it is discharged in the usual way. The medium and shorter lengths of lint are in like manner separated by their appropriate portion of the apparatus.

The lint ducts, the lint-chamber, and the condenser are divided by transverse partitions into three compartments M M' $M^2$, O, O', $O^2$ corresponding with those of the linter comb-roller and concave, and consequently each time that the seeds are discharged from these latter, the lint separated at that operation is drawn through its appropriate compartment of the lint-chamber and condenser, and discharged into a suitable receptacle. I am thus able to assort the lint according to the fineness and quality of its fiber.

The mechanism is driven from any suitable prime mover, by a belt encircling a main driving-pulley Q, on the shaft $F^2$, of the linter comb-roller. A pulley R, on the opposite end of this shaft, carries a belt R', encircling a pulley D', on the feed-roller shaft, from which the stirrer-shaft C', is driven by a belt and pulleys. The shaking-troughs K, K' are oscillated by a cam $k$ on a shaft $k'$, see Fig. 12, driven from the linter roller-shaft in well-known ways, as shown. The fan and condenser are both mounted on the same shaft, and driven by belts and pulleys from the shaft $F^2$.

Having thus fully described the construction, organization, and operation of my im- proved cotton-seed delinter, what I claim therein as new, and desire to secure by Letters Patent, is—

1. The combination, substantially as hereinbefore set forth, of an open-bottomed hopper; a stirrer therein; a feed-roller rotating in the open bottom of the hopper; a linter comb-roller; and its concave between which and the roller the seed pass, to separate the lint therefrom, a delivery chute connecting the hopper and concave deflectors against which the seed are thrown by centrifugal force, and a discharge spout which conducts them to a suitable receptacle.

2. The combination, substantially as hereinbefore set forth, of an open bottom hopper; a feed-roll rotating in said open bottom; a linter comb-roller and its concave divided transversely into compartments; a chute connecting the hopper and first compartment; deflectors for each compartment, against which the seed are thrown by centrifugal force, and passages connecting these compartments and deflectors, whereby the seed are caused to traverse successively each compartment.

3. The combination, substantially as hereinbefore set forth, of a linter comb-roller and concave; their transverse compartments; deflectors for each compartment, against which the seed are thrown by centrifugal force, and passages connecting these compartments and deflectors, whereby the seed are caused to traverse successively each compartment.

4. The combination, substantially as hereinbefore set forth, of a linter comb-roller and concave; their transverse compartments; deflectors for each compartment, against which the seed are thrown by centrifugal force; passages connecting these compartments and deflectors, whereby the seed are caused to traverse successively each compartment, and a shaking-trough traversed by the seed in passing from one compartment to the other.

5. The combination, substantially as hereinbefore set forth, of a linter comb-roller and concave; their transverse compartments; deflectors for each compartment against which the seed are thrown by the roller; passages connecting these compartments; shaking-troughs therein traversed by the seed, and a discharge spout connected with the last compartment.

6. The combination, substantially as hereinbefore set forth, of a hopper; a feed-roll rotating therein; a linter comb-roller and its concave within which it rotates; their transverse compartments; a chute connecting the hopper and first compartment; deflectors for each compartment; passages connecting these compartments; shaking-troughs therein traversed by the seed, and a discharge spout connected with the last compartment.

7. The combination, substantially as hereinbefore set forth, of a linter comb-roller; its concave, between which and the roller the seed pass to separate the lint therefrom; deflectors against which the lint and seed are thrown by centrifugal force; a discharge spout for the escape of the seed; a lint-chamber; its exhaust-fan, and condenser and a lint duct connecting the concave and lint chamber to draw off and discharge the lint.

8. The combination, substantially as hereinbefore set forth, of an open-bottomed hopper; a stirrer therein; a feed-roller rotating in the hopper bottom; a linter comb-roller; its concave a delivery chute connecting the hopper and concave; deflectors against which the seed and lint are thrown by centrifugal force; a discharge spout for the seed; a lint-chamber; its exhaust-fan, and condenser and a series of lint ducts connecting the concave and lint chamber to draw off and discharge the lint.

9. The combination, substantially as hereinbefore set forth, of a linter comb-roller and concave; their transverse compartments; deflectors against which the seed and lint are thrown by centrifugal force; passages connecting these compartments and deflectors, whereby the seed are returned successively to the linter comb-roller and concave; a lint-chamber correspondingly divided into compartments; a lint-duct connecting each compartment of the linter comb-roller with a corresponding compartment of the lint-chamber; an exhaust-fan common to all the lint-compartments, and a condenser extending through all of said compartments, whereby the various grades of lint are discharged into separate receptacles.

10. The combination, substantially as hereinbefore set forth, of a hopper; its feed-roll; a linter comb-roller and concave; their transverse compartments; a chute connecting the hopper and first compartment; deflectors for each compartment, against which the seed and lint are thrown by centrifugal force; passages connecting these compartments; shaking-troughs therein traversed by the seed; a discharge spout connected with the last compartment; a lint-chamber correspondingly divided into compartments; a lint-duct connecting each compartment of the linter comb-roller with a corresponding compartment of the lint-chamber; an exhaust-fan common to all the lint-compartments; a condenser extending through all of said compartments, whereby the various grades of lint are discharged into separate receptacles; and means for actuating the various moving parts.

11. The linter comb-roller hereinbefore described, consisting of the combination of a central shaft; head-plates movable endwise thereon; jam-nuts controlling the head-plates; internal, cone-shaped flanges on the head-plates; longitudinal staves resting on the flanges; comb-sections resting on the staves, and wedge-plates interposed between the comb-sections to lock the parts securely together.

12. A linter-comb constructed substantially as hereinbefore described, with long tapering teeth with rounded edges, and slightly inclined relatively to their plane of rotation, with a radial base and inclined middle portion, and an oppositely inclined external portion, for the purposes described.

13. The hereinbefore described roller linter-comb, consisting of a circular base; comb-sections composed of tapering laterally-inclined teeth, arranged radially in alternate overlapping sections, as shown; retaining rings between the teeth, and locking-wedges between the sections.

14. The linter-comb concave hereinbefore described, consisting of the combination of a semi-cylindrical trough; its wooden lining of longitudinal bars or staves, and the flat prongs or springs inserted therein in alternate rows or sets $g$, $g'$, the prongs $g$, being straight, stiffer and farther apart circumferentially than the other set $g'$, the inner prongs of which latter are bent inward as shown, for the purpose described.

15. The combination, substantially as hereinbefore set forth, of the linter comb-roller and its tapering laterally inclined elastic teeth with the concave-teeth $g$, $g'$, consisting of flat prongs or springs, the prongs $g$, being straight, stiffer and farther apart circumferentially than the other set $g'$, the inner prongs of which latter are bent inward, these parts co-operating as shown to detain and delint the seed, as set forth.

In testimony whereof I have hereunto subscribed my name.

ROBERT F. SPANGENBERG.

Witnesses:
 GEORGE EDGETT,
 CHS. J. GAUTHREANE.